United States Patent [19] [11] Patent Number: 4,802,001
Tabei et al. [45] Date of Patent: Jan. 31, 1989

[54] MICRO FILTER ARRANGEMENT IN AN INTERLACED SOLID-STATE IMAGE PICKUP ELEMENT

[75] Inventors: Masatoshi Tabei; Kazuhiro Kawajiri, both of Kanagawa, Japan

[73] Assignee: Fuji Photo Film Co., Ltd., Kanagawa, Japan

[21] Appl. No.: 909,541

[22] Filed: Sep. 22, 1986

[30] Foreign Application Priority Data

Sep. 20, 1985 [JP] Japan .................. 60-206254
Sep. 20, 1985 [JP] Japan .................. 60-206255
Oct. 4, 1985 [JP] Japan .................. 60-220194
Oct. 9, 1985 [JP] Japan .................. 60-223806

[51] Int. Cl.$^4$ .............................................. H04N 9/07
[52] U.S. Cl. ................................... 358/48; 358/44
[58] Field of Search .................. 358/48, 44, 41, 43

[56] References Cited

U.S. PATENT DOCUMENTS

| 4,047,203 | 9/1977 | Dillon | 358/44 |
| 4,054,915 | 10/1977 | Sugihara | 358/41 |
| 4,059,839 | 11/1977 | Yamanaka et al. | 358/44 |
| 4,117,510 | 9/1978 | Ohta et al. | 358/48 X |
| 4,121,244 | 10/1978 | Nakabe et al. | 358/44 |
| 4,151,553 | 4/1979 | Sugihara | 358/48 X |
| 4,200,883 | 4/1980 | Yamanaka et al. | 358/44 |
| 4,237,477 | 12/1980 | Weimer | 358/44 |
| 4,242,700 | 12/1980 | Weimer | 358/44 |
| 4,245,241 | 1/1981 | Sato et al. | 358/44 |
| 4,246,601 | 1/1981 | Sato et al. | 358/44 X |
| 4,281,338 | 7/1981 | Takahashi et al. | 358/44 |
| 4,513,313 | 4/1985 | Kinoshita et al. | 358/44 |
| 4,580,160 | 4/1986 | Ochi et al. | 358/48 |
| 4,658,287 | 4/1987 | Chen | 358/48 |
| 4,710,804 | 12/1987 | Ide | 358/48 |

FOREIGN PATENT DOCUMENTS

| 53-079433 | 7/1978 | Japan | 358/44 |
| 53-079435 | 7/1978 | Japan | 358/44 |
| 56-158586 | 12/1981 | Japan | 358/43 |
| 57-041091 | 3/1982 | Japan | 358/44 |
| 59-13487 | 1/1984 | Japan | 358/44 |
| 59-25490 | 2/1984 | Japan | 358/48 |
| 60-142690 | 7/1985 | Japan | 358/44 |

Primary Examiner—James J. Groody
Assistant Examiner—E. Anne Faris
Attorney, Agent, or Firm—Sughrue, Mion, Zinn, Macpeak & Seas

[57] ABSTRACT

A solid image pickup element for use in interlaced scanning in which at least two lines of photo-elements are simultaneously read in one interlaced scanning line. The lines are algebraically combined to reproduce the color signals and different groups of lines are read for different interlace fields.

7 Claims, 6 Drawing Sheets

FIG. 6

| | | | | |
|---|---|---|---|---|
| $Mg_A$ | $Mg_A$ | $Mg_A$ | $Mg_A$ | ⎫ A FIELD |
| $Cy_A$ | $Cy_B$ | $Cy_A$ | $Cy_B$ | ⎭ B FIELD |
| $Mg_B$ | $Mg_B$ | $Mg_B$ | $Mg_B$ | |
| $Mg_A$ | $Mg_A$ | $Mg_A$ | $Mg_A$ | |
| $Ye_A$ | $Ye_B$ | $Ye_A$ | $Ye_B$ | |
| $Mz_B$ | $Mz_B$ | $Mz_B$ | $Mz_B$ | |

| | | | | | | | | |
|---|---|---|---|---|---|---|---|---|
| $W_A$ | $W_A$ | $W_A$ | $W_A$ | -- $W_A$ | --- | | | ⎫ A FIELD |
| $R_A$ | $R_B$ | $B_A$ | $B_B$ | $R_A$ | $R_B$ | $B_A$ | $B_B$ | ⎭ B FIELD |
| $W_B$ | $W_B$ | $W_B$ | $W_B$ | -- $W_B$ | --- | | | |
| $W_A$ | $W_A$ | $W_A$ | $W_A$ | -- $W_A$ | --- | | | |
| $B_A$ | $B_B$ | $R_A$ | $R_B$ | $B_A$ | $B_B$ | $R_A$ | $R_B$ | |
| $W_B$ | $W_B$ | ------ | | | | | | |

1

MICRO FILTER ARRANGEMENT IN AN INTERLACED SOLID-STATE IMAGE PICKUP ELEMENT

BACKGROUND OF THE INVENTION

1. Field of the Invention

This invention relates to a high-resolving-power solid-state image pickup device comprising a solid-state image sensor and a mosaic microfilter. A mosaic microfilter is an array of minute filter elements one element per photoelectric sensor element of the pickup device.

2. Description of the Prior Art

A method of forming a solid-state image pickup device for color image is well known in the art. This method arranges a mosaic or a line type microfilter on a solid image sensor. The solid-state image sensor comprises a light receiving section, a charge transferring section and a transfer control section. The terms "solid-state image sensor" and "solid-state image pickup device" basically mean the same thing. However, for convenience in description, the term "a solid-state image sensor" as used herein is intended to mean one for monochromatic light which is used to detect only an image brightness, and the term "solid-state image pickup device" as used herein intended to mean the assembly of the solid-stage image sensor and the microfilter. The light receiving section comprises a plurality of photoelectric conversion elements arranged in a matrix form, and microfilters are so arranged that the elements of its mosaic correspond to each of the photoelectric conversion elements, that is, one color is assigned to one photoelectric conversion element. For instance, of three colors R(red), G(green) and B(blue), R is assigned to one photoelectric conversion element.

There are a variety of systems to arrange the red, green and blue filters in a mosaic pattern, and the colors of the filters may be complementary colors cyan(Cy), magenta(Mg) and yellow(Ye), and white(W).

Fundamentally, if the red, green and blue filters are repetitively arranged, in the stated order, according to the scanning sequence, then the color signals are obtained at a uniform frequency. However, in the system, the same color signals are obtained in a three-picture-element synchronization mode, and therefore the horizontal resolution is lowered to one-third (⅓). In practice, in order to prevent the apparent lowering of the resolution, a so-called "Bayer's arrangement" is effectively employed for arrangement of the filters. In the arrangement, the filters on lines corresponding to the odd-numbered scanning lines are arranged in the order of R,G,R,G, . . . , while filters on lines corresponding to the even-numbered scanning lines are arranged in the order of G,B,G,B, . . . In this case, the image signal of the previous scanning line is delayed by a 1H (one horizontal scan period) delay line and combined with the image signal of the present scanning line; that is, combination of the image signals of two adjacent scanning lines forms any color signal within a period of at least two picture elements.

In another conventional solid-state image pickup device for color images, the mosaic microfilters have the colors R(red), G(green), R, G, . . . on the first and second lines, and the colors G(green), B(blue), G, B, . . . on the third and fourth lines. The arrangement of these four lines is repeated. In order to form a television image field signal according to an interface system, first the odd-numbered lines of the solid-state image pickup device are successively read, and a 1H delay line is used so that R, and G and B signals are formed by utilizing the image signals read out of two lines. In this operation, a luminance signal Y is formed through weighted addition according to the following equation:

$$Y = 0.11B + 0.59G + 0.3R$$

According to this, color difference signals R-Y and B-Y can also be formed.

In the case where an interlaced scanning operation with alternating A and B fields is carried out when the "Bayer's arrangement" is employed, the (2n+1)th and the (2n+2)th line are combined for the A field (where n may be zero and or a positive integer) while the (2n+2)th and the (2n+3)th line are combined for the B field, so that images signals coresponding to the respective scanning lines are formed. This interlaced scanning operation is, in a sense, carried out for convenience, and therefore the resolving power in the vertical direction is lowered.

SUMMARY OF THE INVENTION

An object of this invention is to provide a solid-state image pickup device for color images in which an interlaced scanning operation is carried out without lowering the resolving power in the vertical direction and which has a resolving power corresponding to that of a solid-state image sensor for monochromatic light, to form color image signals according to the standard television system.

Another object of this invention is to provide a solid-state image pickup device for color images, simple in construction, in which the color signal composing circuit is simplified, and it is unnecessary to use a 1H delay line.

According to the present invention, the above and other objects of the present invention are accomplished by the provision of a solid-state image pickup device for color images comprising a solid-state image sensor including a light receiving section, a charge transferring section and a transfer control section, and color microfilters provided on the light receiving section wherein photoelectric conversion elements of the light receiving section with the color microfilters arranged in a matrix form are assigned to scanning lines in such a manner that at least two lines of the photoelectric conversion elements are provided for each scanning line.

BRIEF DESCRIPTION OF THE DRAWINGS

In the accompanying drawings:

FIGS. 6 and 7 are explanatory diagram showing modifications of an arrangement of mosaic microfilters employed in the solid-state image pickup device according to the invention;

DETAILED DESCRIPTION OF THE PREFERRED EMBODIMENT

Embodiments of the invention will be described with reference to the accompanying drawing.

Figure 1:
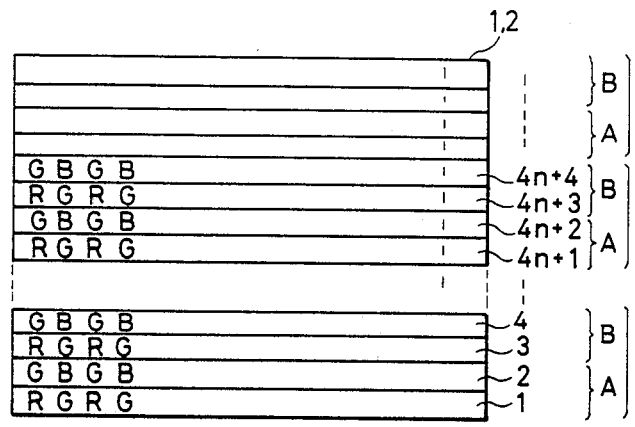
FIGS. 1 and 2 are schematic diagrams illustrating examples of the arrangement of photoelectric conversion elements and color microfilters in a solid-state image pickup device according to the present invention.

FIG. 1 is a schematic diagram for a description of the arrangement of photoelectric conversion elements and microfilters in a solid-state image pickup device according to the present invention. The solid-state image pickup device 1, 2 comprises a light receiving section, a charge transferring section and a transfer control section, and mosaic microfilters formed to overlie at least the light receiving section. In the invention, a solid-state image sensor may be made up of a CCD. However, it goes without saying that a MOS type image sensor may be employed. That is, all kinds of solid-state image sensors can be employed in the invention.

The construction and operation of the light receiving section, the charge transferring section and the transfer control section of the solid-state image pickup device are well known in the art, and their detailed descriptions will not be made herein. However, they are more fully described in Japanese Patent Application Nos. 60-206256 and 60-212660, which have been combined and filed on Sept. 22, 1986 as U.S. patent application Ser. No. 909,542 by Jin Murayama, Ryuji Kondo, and Yoshimitsu Kudo. This U.S. patent application is incorporated herein by reference.

In the embodiments illustrated, the solid-state image pickup device is suitable for a standard television system, i.e., the NTSC system. Therefore, the light receiving section has about 1,000 lines of photoelectric conversion elements, each line including about 500 to about 800 photoelectric conversion elements.

In FIG. 1, lines A and B are those which are used for reading the image signals of A and B fields during interlaced scanning. That is, the $(2m\cdot n+1)$th through the $(2m\cdot n+m)$th lines are assigned to the A field, while the $(2m\cdot n+m+1)$th through the $(2m\cdot n+2m)$ lines are assigned to the B field. In the first example of FIG. 1, two lines of photoelectric conversion elements are assigned to each scanning line. Therefore, if $m=2$ is inserted in the above-described expressions, then the image signals of the A field are read from the 1st, 2nd, ..., $(4n+1)$th, $(4n+2)$th, ... lines while the image signals of the B field are read from the 3rd, 4th, ..., $(4n+3)$th, $(4n+4)$th, ... lines. For instance, filter elements are arranged on the $(4n+1)$th line of the A field in order of RGRG..., and on the $(4n+2)$th line in the order of GBGB... Therefore, when the image signals read from the photoelectric conversion elements of these two lines are combined together, then R, G and B signals are independently obtained every two photoelectric conversion elements which are adjacent to each other in the horizontal direction. The image signals thus obtained are independent of those of the B field. Accordingly, the solid-state image pickup device of the invention can provide image signals whose resolving power in the vertical direction is not lowered.

Figure 2:
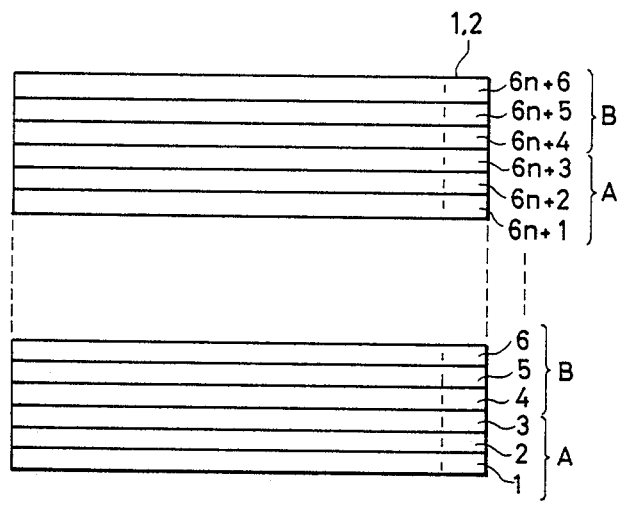

FIG. 2 is a second example of the solid image pickup device in which photoelectric conversion elements arranged in a matrix form in the light receiving section are assigned to the scanning lines in such a manner that three lines of photoelectric conversion elements are provided for each scanning line. Since the technical concept of the second example is equal to that of the first example shown in FIG. 1, its detailed description will not be made here.

Figure 3:
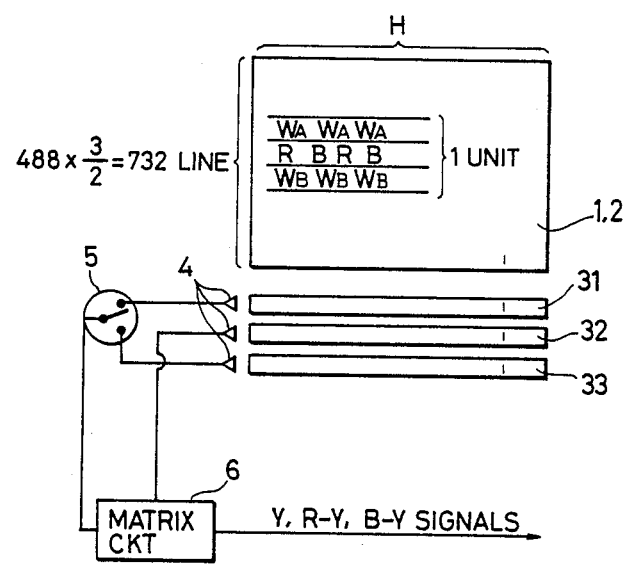
FIG. 3 is a block diagram showing a first embodiment of the invention in which a solid-state image pickup device according to the invention is applied to a television camera.

In a first embodiment of the invention shown in FIG. 3, a solid-state image pickup device according to the invention is employed for the ordinary television camera. A light receiving section 1 and a vertical charge transferring section 2 are indicated as one block. Only one group of the mosaic microfilters provided on the light receiving section 1 is indicated by reference characters or symbols $W_A$, $W_B$, R and B representing colors. Reference character $W_A$ designates a white (or transparent) filter for the A field, and $W_B$ a white filter for the B field.

It is well known in the art that luminance data Y and two color data, for instance R and B, can completely reproduce all colors.

The signal charge transferred through the vertical charge transferring section 2 is supplied to three horizontal charge transferring sections 31, 32 and 33 such as parallel loaded shift registers, which are provided in correspondence to the number of horizontal lines of each group. The horizontal charge transferring section 31 is assigned to the first line, the charge transferring section 32 to the second line, and the charge transferring section 33 to the third line and these charge transferring sections 31, 32 and 33 are connected to the respective lines by respective vertical lines.

The signal charges read out of the horizontal charge transferring sections 31, 32 and 33 through amplifiers 4 are applied to a matrix circuit 6 through a change-over switch 5 adapted to select one of the A and B fields. In order to read out the A field signals, the armature of the switch 5 is tripped over to the upper position in FIG. 3, and in order to read out the B field signal, the armature is tripped over to the lower position; that is, the armature of the switch 5 is tripped every field, i.e., every 1/60 second.

The matrix circuit 6 is a weighted addition (subtraction) circuit using resistors, as well known in the art. The luminance signal Y and the color signals R and B supplied to the matrix circuit 6 through the switch 5 from the horizontal charge transferring sections 31, 32 and 33 during each field period are processed in the matrix circuit 6, which outputs the luminance signal Y and color difference signals R-Y and B-Y.

Figure 4:
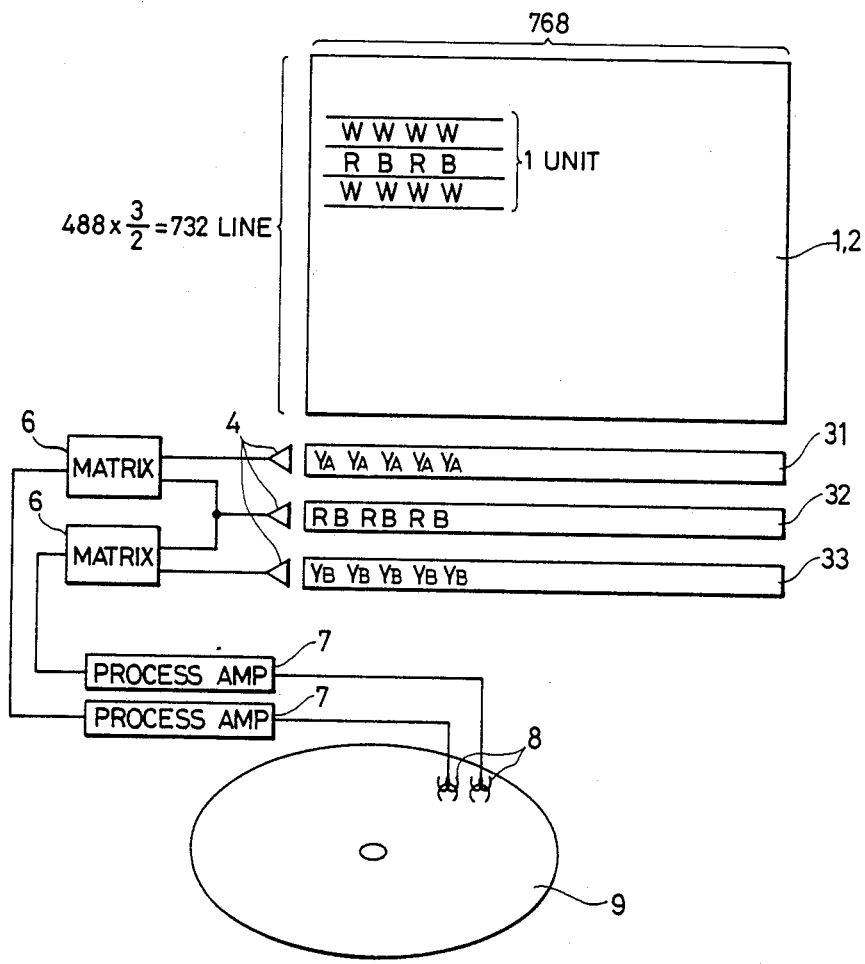
FIG. 4 is a block diagram showing a second embodiment of the invention in which a solid-state image pickup device is applied to a still camera.

For simplification in illustration, no transfer control section is shown in FIGS. 3 and 4.

In a second embodiment shown in FIG. 4, the solid-state image device of the invention is applied to a still camera. In the second embodiment, a light receiving section 1, a vertical charge transferring section 2, horizontal charge transferring sections 31, 32 and 33, a reading amplifier 4, and a transfer control section are the same in construction as those of the first embodiment shown in FIG. 3.

The signal charges read out of the horizontal charge transferring sections 31, 32 and 33 are supplied to two matrix circuits 6 through the amplifiers 4. In this operation, the signal charge including color data read out of the horizontal charge transferring section 32 is supplied to the two matrix circuits 6. The two matrix circuits 6 outputs the luminance signals Y and the color difference signals R-Y and B-Y of the A and B fields. These signals are amplified and processed by independent amplifiers 7 and applied through independent magnetic heads 8 to a magnetic disc 9, where they are recorded on independent tracks, respectively. The signals thus recorded are illustrated in manners well known in the art.

In the invention, any solid-state image sensor such as an FTCCD, ILCCD, DSD or appropriate type solid-state image sensor may be employed.

In practice, the solid-state image pickup device of 565 picture elements according to the invention has a resolving power corresponding to that of the conventional image pickup device of 805 picture elements.

Figure 5:
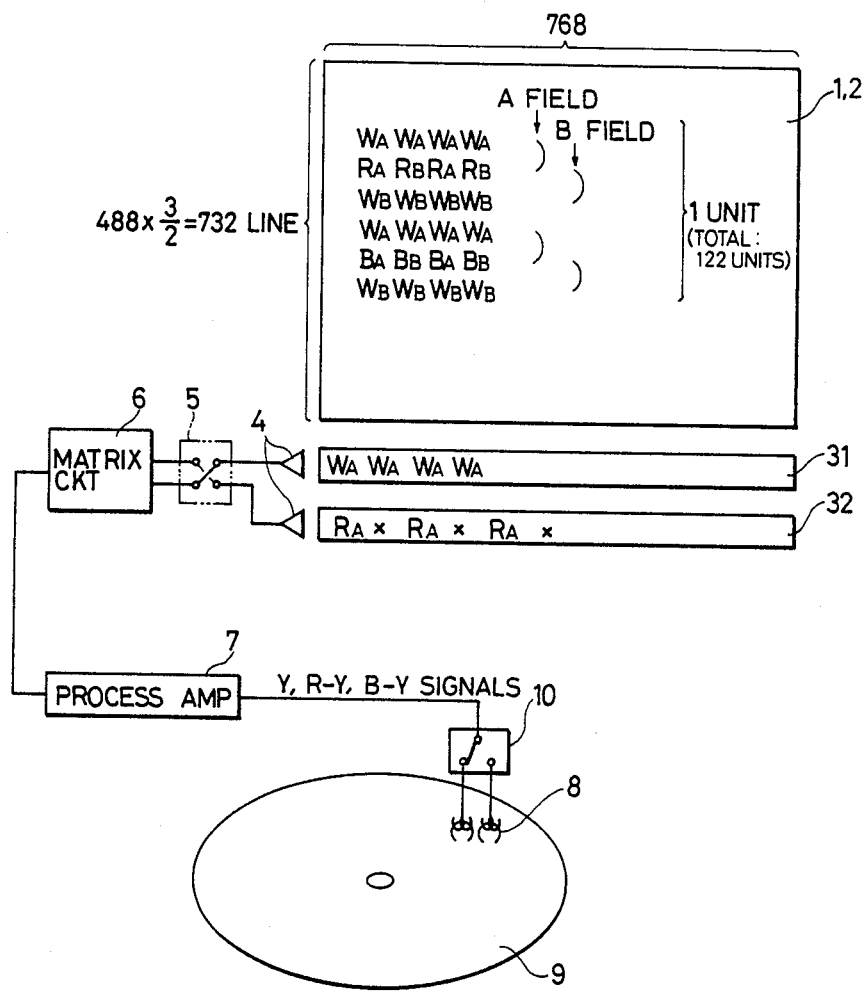
FIG. 5 is a block diagram showing a third embodiment of the invention in which a solid-state image pickup device is applied to a still camera.

FIG. 5 shows a third embodiment of the invention in which a solid-state image pickup device according to the invention is applied to a still camera.

As is well known in the art, the resolving power of the human eye is not very high for color data. Therefore, even if color data are used commonly for both the A field and the B field, the lowering of the resolving power is not recognized. On the other hand, in the case of luminance data, it is necessary for the human eye to be supplied with an image of high resolving power. To achieve this high resolving power, luminance data $W_A$ or $W_B$, independent of each other, are provided separately for the A field and the B field to the horizontal charge transferring section 31. Accordingly, the solid-state image pickup element of the invention has a resolving power substantially equal to that of a solid-state image pickup element which has completely independent picture elements for each of the A and B fields.

For simplification in illustration, a light receiving section 1 and a vertical charge transferring section 2 are indicated as a block. Only a part of the microfilters placed on the light receiving section 1 is illustrated. The separate microfilters are indicated by reference characters $W_A$, $W_B$, $R_A$, $R_B$, $B_A$ and $B_B$ representing colors. In these symbols, as described above, the suffix letters "A" and "B" indicate respectively the field A and the field B. In the embodiment shown in FIG. 5, the colors R and B are used for alternating groups of microfilter. That is, one group of three lines contains on one line R color microfilters and the next group of three lines has a B line, however, it is possible to arrange the R and B microfilters for every picture element along a line of each group. The symbol "W" indictes a luminance data color, that is white (or transparent).

The signal charge transferred through the vertical charge transferring section 2 is supplied to horizontal charge transferring sections 31 and 32. The vertical charge transfer is carried out for every three horizontal lines, and the $W_B$ or $W_A$ data is abandoned depending on whether the field being handled is the A field or the B field. Also the color data $R_A$ or $R_B$ (or $B_A$ or $B_B$) is not used when the other field is being read. FIG. 5 shows the state that the A field signals are being read out.

The signal charges read out of the horizontal charge transferring sections 31 and 32 through amplifiers 4 are supplied to a matrix circuit 6 through a change-over switch 5 which selects one of the A and B fields. In the case of reading out the B field signals, as opposed to the case of FIG. 5, the color data are stored in the horizontal charge transferring section 31 while the luminance data are stored in the horizontal charge transferring section 32. Therefore, in this case, the switch 5 is used to invert the correlation between the two input terminals of the matrix circuit 6 and the two horizontal charge transferring sections 31 and 32. The armature of the change-over switch 5 is tripped every field, i.e., every 1/60 second.

In the embodiment, the color data are read out in such a manner that, for every group, the colors R and B occur alternately. Accordingly, in the embodiment, the color images are formed according to a so-called "line sequential color TV system". If, in this case, red (R) and blue (B) filters are alternately arranged to the NTSC television system can be obtained at the output terminal of the matrix circuit 6.

As described above, the matrix circuit 6 is made up of a weighted addition (subtraction) circuit with resistors as is well known in the art. The luminance signal Y and the color signals R and B supplied to the matrix circuit 6 through the switch 5 from the horizontal charge transferring sections 31 and 32 during each field period are processed by the matrix circuit 6, which outputs the luminance signal Y and color difference signals R-Y and B-Y.

These signals, after being amplified and processed by an amplifier 7, are distributed to the A field and the B field, and are recorded on independent tracks of a magnetic disc 9 with the aid of two magnetic heads 8. In this operation, the armature of a switch 10 is tripped in synchronization with the armature of the switch 5.

FIGS. 6 and 7 show other examples of the mosaic microfilters which are provided on the light receiving section in correspondence to picture elements.

In the case of FIG. 6, the first and third lines providing luminance data are made up of magenta (Mg) filters, and the second line providing color data is made up of filters which are arranged in such a manner that two complementary colors (Cy and Ye) occur alternately.

In the case of FIG. 7, achromatic filters providing luminance data are arranged similarly as in the case of FIG. 1, and color data filters are arranged in such a manner that two colors (R and B) occur for every two picture elements.

Figure 8:
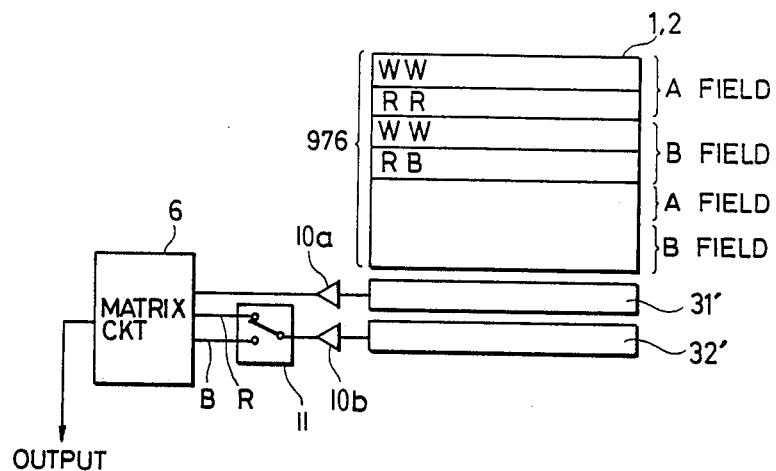
FIG. 8 is a block diagram showing a fourth embodiment of the present invention.

FIG. 8 is a block diagram showing a fourth embodiment of the present invention.

In FIG. 8, a light receiving section 1 and a vertical charge transferring section 2 are also indicated as a block. Microfilters arranged on the light receiving section 1 in correspondence to picture elements are designated by reference characters W, R and B as shown in FIG. 8.

In the microfilters shown in FIG. 8, each of the A and B fields comprises a horizontal line (W, W . . . ) exclusively for luminance, and another horizontal line (R, B, R, B, . . . ) exclusively for color, and the A and B fields are arranged in a vertical direction in such a manner that the A and B fields occur alternately.

A horizontal charge transferring seciton comprises a transferring unit 31, such as a parallel loaded shift register exclusively for luminance and another transferring unit 32 exclusively for color. The luminance signal and the color signal, which are read by the light receiving section are applied through the vertical charge transferring section 2 to the respective transferring units 31' and 32'.

The luminance signal and the color signal, which are applied to the transferring units 31' and 32', respectively, are read out by amplifiers 10a and 10b. The color signal output of the amplifier 10b receiving the color signal is applied to a change-over switch 11. As a result, the luminance signal and one of the color signals are simultaneously read out and applied to an a matrix circuit 6.

The armature of the change-over switch 11 is tripped with a period f/2 (where f is the sampling frequency) so that the signals R and B are separately supplied to respective terminals of the matrix circuit 6.

The matrix circuit 6 is a weighted addition (subtraction) circuit built with resistors, which is the same as those in the other embodiments. The luminance signals and the color signals which are supplied to the matrix circuit through the horizontal charge transferring units 31' and 32' are processed by the matrix circuit 6, which outputs color signals R, G and B, or a luminance signal Y and color difference signals R-Y and B-Y.

Figure 9:
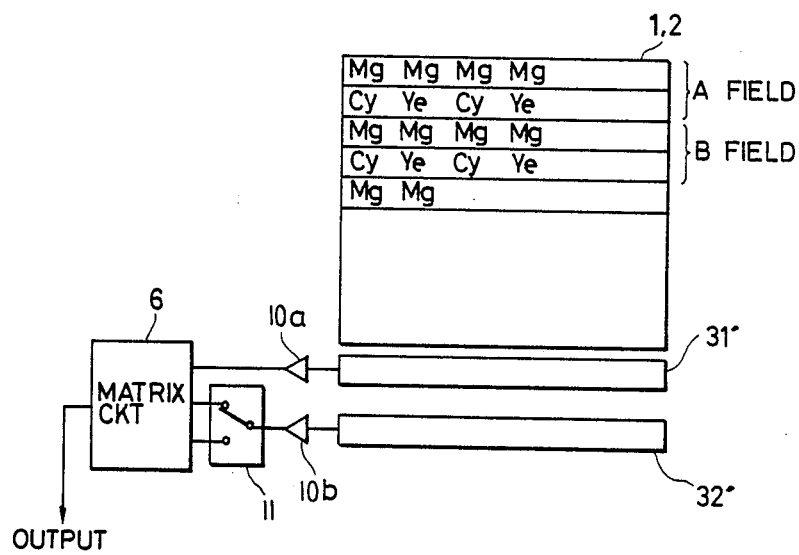
FIG. 9 is a block diagram showing a modification of the arrangement of microfilters employed in the fourth embodiment of FIG. 8.

FIG. 9 shows one modification of the arrangement of the microfilters. In the modification, complementary filters are employed. Magenta (Mg) filters are used exclusively for luminance, and cyan (Cy) filters and yellow (Ye) filters are arranged exclusively for color in such a manner that cyan and yellow occur alternately. Alternatively, green (G) filters may be employed for luminance signals.

As described above, in the solid-state image pickup element of the invention, a plurality of adjacent lines of photoelectric conversion elements are assigned to each television scanning line, and the image signals read from the photoelectric conversion elements of these plural lines are combined together, and during interlaced scanning image signals are formed with the two scanning lines as a unit. Therefore, no 1H delayed line is required, the interlaced scanning operation is correctly carried out and the resolving power in the vertical direction is improved.

What is claimed is:

1. A solid-state image pickup device for color images, comprising:
    a solid-state image sensor including a light receiving section, said light receiving section including a plurality of photoelectric conversion elements;
    a charge transferring section for transferring charges from said light receiving section and including means for scanning in a scanning line at least two horizontal lines of said photoelectric conversion elements; and
    color microfilters provided on said light receiving section, wherein said photoelectric conversion elements of said light receiving section and the color microfilters associated therewith are arranged in a matrix form and are assigned to scanning lines in such a manner that at least two horizontal lines of said photoelectric conversion elements are associated with each scanning line, said photoelectric conversion elements and said microfilters being arranged with three horizontal lines for every two scanning lines, one of said three horizontal lines being associated with two of said scanning lines, every three horizontal lines forming a group, and wherein said charge transferring section reads out a luminance signal for a first field image signal from a first horizontal line of each group, reads out a luminance signal for a second field image signal from a third horizontal line of each group, and reads out color signals for both the first and second field images from a second horizontal line of each group.

2. A solid-state image pickup device for color images as recited in claim 1, wherein said microfilters of the first and third horizontal lines of each group comprise achromatic and green filters, and said microfilters of said second line comprise filters having at least one of primary colors R, G and B.

3. A solid-state image pickup device for color images as recited in claim 1, wherein said microfilters of the first and third horizontal lines of each group comprise achromatic and magenta filters, and said microfilters of said second line comprise filters having at least one of complementary colors Cy, Ye and Mg.

4. A solid-state image pickup device for color images as recited in claim 2, wherein said microfilters of said second line comprise filters of two alternating ones of said primary colors.

5. A solid-state image pickup device for color images as recited in claim 3, wherein said microfilters of said second line comprise filters of two alternating ones of said complementary colors.

6. A solid-state image pickup device for color images, comprising:
    a solid-state image sensor including a light receiving section, said light receiving section including a plurality of photoelectric conversion elements;
    a charge transferring section for transferring charges from said light receiving section and including two horizontal charge transferring means and means for scanning in a scanning line at least two horizontal lines of said photoelectric conversion element; and
    color microfilters provided on said light receiving section, wherein said photoelectric conversion elements of said light receiving section and the color microfilters associated therewith are arranged in a matrix form and are assigned to scanning lines in such a manner that at least two horizontal lines of said photoelectric conversion elements are associated with each scanning line; and
    wherein said charge transferring section, in reading out image signals for a first field, reads out a luminance signal and a color signal from a first and a second horizontal line through said two horizontal charge transferring means, and, in reading out image signals for a second field, reads out a color signal and a luminance signal from said second and a third horizontal line through said two charge transferring means.

7. A solid-state image pickup device for color images, comprising:
    a solid-state image sensor including a light receiving section, said light receiving section including a plurality of photoelectric conversion elements;
    a charge transferring section for transferring charges from said light receiving section and including two horizontal charge transferring means for scanning in a scanning line at least two horizontal lines of said photoelectric conversion elements; and
    color microfilters provided on said light receiving section, wherein said photoelectric conversion elements of said light receiving section and the color microfilters associated therewith are arranged in a matrix form and are assigned to scanning lines in such a manner that at least two horizontal lines of said photoelectric conversion elements are associated with each scanning line; and
    a first of said two horizontal charge transferring means being exclusively for a color signal and a second of said horizontal charge transferring means being exclusively for a luminance signal, and wherein a luminance signal and a color signal detected by each scanning operation by said charge transferring section is distributed to said first horizontal charge transferring means and said second horizontal charge transferring means, respectively, which are read out simultaneously in a pair.

* * * * *